US009828845B2

(12) United States Patent
Kpetehoto et al.

(10) Patent No.: US 9,828,845 B2
(45) Date of Patent: Nov. 28, 2017

(54) AUTOMATED DRILLING OPTIMIZATION

(71) Applicants: Franck T. Kpetehoto, Houston, TX (US); James Albert Hood, Houston, TX (US); Stephen Carey, Houston, TX (US)

(72) Inventors: Franck T. Kpetehoto, Houston, TX (US); James Albert Hood, Houston, TX (US); Stephen Carey, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 768 days.

(21) Appl. No.: 14/293,563

(22) Filed: Jun. 2, 2014

(65) Prior Publication Data
US 2015/0345262 A1 Dec. 3, 2015

(51) Int. Cl.
*E21B 44/02* (2006.01)

(52) U.S. Cl.
CPC .................. *E21B 44/02* (2013.01)

(58) Field of Classification Search
CPC ................................ E21B 41/0092
See application file for complete search history.

(56) References Cited

U.S. PATENT DOCUMENTS

| 6,293,356 B1 | 9/2001 | King et al. |
| 6,662,110 B1 | 12/2003 | Bargach et al. |
| 6,732,052 B2 | 5/2004 | MacDonald et al. |
| 7,142,986 B2 | 11/2006 | Moran |
| 7,172,037 B2 | 2/2007 | Dashevskiy et al. |
| 7,318,488 B2 | 1/2008 | Hutchinson |
| 7,413,032 B2 | 8/2008 | Krueger |

(Continued)

FOREIGN PATENT DOCUMENTS

| WO | 2012080810 A2 | 6/2012 |
| WO | 2013002782 A1 | 1/2013 |
| WO | 2013126040 A1 | 8/2013 |

OTHER PUBLICATIONS

Dunlop, et al., "Optimizing ROP through Automation", Sep. 21, 2011, http://www.drillingcontractor.org/optimizing-rop-through-automation-2-10696, 7 pages.
(Continued)

*Primary Examiner* — Manuel Rivera Vargas
(74) *Attorney, Agent, or Firm* — Cantor Colburn LLP

(57) ABSTRACT

A method implemented by a processor for drilling a borehole includes: inputting drilling parameters used to drill one or more offset boreholes, rate of penetration for the one or more offset boreholes, and one or more lithologies for the one or more offset boreholes; identifying those drilling parameters that correspond to a rate of penetration (ROP) that meets or exceeds a selected ROP threshold for each input lithology; correlating a borehole plan comprising a borehole path to be drilled and one or more assumed lithologies as a function of depth to the one or more lithologies of the one or more offset boreholes; sending the identified drilling parameters to a drill rig controller for each of the assumed lithologies in the borehole plan; and drilling the borehole with the drill rig using the identified drilling parameters for each of the one or more assumed lithologies in the borehole plan.

16 Claims, 3 Drawing Sheets

(56) References Cited

U.S. PATENT DOCUMENTS

| | | |
|---|---|---|
| 7,938,197 B2 | 5/2011 | Boone et al. |
| 8,453,764 B2 | 6/2013 | Turner et al. |
| 8,561,720 B2 | 10/2013 | Edbury et al. |
| 8,596,385 B2 | 12/2013 | Benson et al. |
| 2004/0196038 A1 | 10/2004 | Kruspe et al. |
| 2004/0256152 A1 | 12/2004 | Dashevskiy et al. |
| 2005/0284661 A1* | 12/2005 | Goldman ............... E21B 12/02 175/39 |
| 2006/0180349 A1 | 8/2006 | Dshevskiy |
| 2006/0212224 A1 | 9/2006 | Jogi et al. |
| 2012/0118636 A1 | 5/2012 | Koederitz et al. |
| 2012/0261190 A1 | 10/2012 | Krueger, IV et al. |

OTHER PUBLICATIONS

Notification of Transmittal of the International Search Report and the Written Opinion of the International Searching Authority, or the Declaration; PCT/US2015/033503; dated Aug. 26, 2015, 12 pages.

Pink et al., "Autnnation of Downhole, Surface Components Optimizes Drilling Process", The American Oil & Gas Reporter, 2013, 10 pages.

Robnett et al., "Real-Time Downhole Drilling Process Data Comlement Surface Data in Drilling Optimization", IADC/SPE Asia Pacific Drilling Technology, Sep. 8-11, 2002, Jakarta, Indonesia, 1 page.

\* cited by examiner

AUTOMATED DRILLING OPTIMIZATION

BACKGROUND

Earth formations may be used for various purposes such as hydrocarbon production, geothermal production, and carbon dioxide sequestration. These reservoirs are typically accessed by drilling boreholes through the earth to the reservoirs.

A borehole is drilled using a drill bit that is rotated by drill pipes coupled together in series and generally referred to as a drill string. A drill rig disposed at the surface of the earth or at the surface of the ocean for ocean drilling applies forces to the drill string and thus to the drill bit for cutting formation rock. The forces may include rotational force or torque for rotating the drill string, weight on the drill bit, and force due to the flow of drilling fluid internal to the drill string. The combination of the drill string forces applied to the drill string result in a rate of penetration into the formation being drilled. It would be appreciated by the drilling industry if a method was developed that estimates a combination of drill string force values or parameters that would improve the rate of penetration and lower the cost of drilling a borehole.

BRIEF SUMMARY

Disclosed is a method for drilling a borehole penetrating the earth using a drill rig that operates a drill string. The method includes: inputting into a processor (i) drilling parameters as a function of depth used to drill one or more offset boreholes, (ii) rate of penetration as a function of depth using the drilling parameters for the one or more offset boreholes, and (iii) one or more lithologies as a function of depth for the one or more offset boreholes; identifying, using the processor, those drilling parameters that correspond to a rate of penetration (ROP) that meets or exceeds a selected ROP threshold for each input lithology to provide identified drilling parameters; correlating a borehole plan having a borehole path to be drilled and one or more assumed lithologies as a function of depth to the one or more lithologies of the one or more offset boreholes using the processor; sending the identified drilling parameters to a drill rig controller for each of the assumed lithologies in the borehole plan; and drilling the borehole with the drill rig using the identified drilling parameters that provide the ROP that meets or exceeds the selected ROP threshold for each of the one or more assumed lithologies in the borehole plan.

Also disclosed is a method for drilling a borehole penetrating the earth using a drill rig that operates a drill string. The method includes: inputting into a processor (i) drilling parameters as a function of depth used to drill one or more offset boreholes, (ii) rate of penetration using the drilling parameters for the one or more offset boreholes, (iii) any drilling dysfunctions that occurred using the drilling parameters for the one or more offset boreholes, and (iv) one or more lithologies as a function of depth for the one or more offset boreholes; identifying, using the processor, those drilling parameters that correspond to a rate of penetration (ROP) that meets or exceeds a selected ROP threshold for each input lithology to provide identified drilling parameters and/or to a minimum number of drill dysfunctions or minimum magnitude of a drilling dysfunction to provide identified drilling parameters; correlating a borehole plan having a borehole path to be drilled and one or more assumed lithologies as a function of depth to the one or more lithologies of the one or more offset boreholes; automatically transmitting identified drilling parameters to a drill rig controller for a change in lithology when a depth is reached signifying the beginning of an interval of the changed lithology according to the borehole plan; drilling the borehole with the drill rig using the identified drilling parameters that provide the ROP that meets or exceeds the selected ROP threshold for each of the one or more assumed lithologies in the borehole plan; and sending an override signal from the processor to the drill rig controller based on a drilling performance indicator sensed by a drilling performance sensor.

Further disclosed is an apparatus for drilling a borehole penetrating the earth using a drill rig that operates a drill string. The apparatus includes a processor that is configured to: receive (i) drilling parameters as a function of depth used to drill one or more offset boreholes, (ii) rate of penetration using the drilling parameters for the one or more offset boreholes, (iii) any drilling dysfunctions that occurred using the drilling parameters for the one or more offset boreholes, and (iv) one or more lithologies as a function of depth for the one or more offset boreholes; identify those drilling parameters that correspond to a maximum rate of penetration for each received lithology to provide identified drilling parameters; correlate a borehole plan having one or more assumed lithologies as a function of depth to the one or more lithologies of the one or more offset boreholes using the processor; and transmitting the identified drilling parameters that provide the maximum rate of penetration for each of the one or more assumed lithologies in the borehole plan to the drill rig for drilling the borehole.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are method and associated apparatus for drilling a borehole penetrating the earth using a drill rig that operates a drill string. The method and apparatus optimize or improve the rate of penetration of the drill string into a formation layer being drilled as compared to conventional methods and apparatus. Drilling parameters obtained from previously drilled offset boreholes are analyzed to determine which of the drilling parameters provide the highest rate of penetration (ROP) and an associated low number and/or magnitude of drilling dysfunctions for each of the lithologies through which the offset boreholes were drilled. A borehole plan is generated using the lithology information from offset boreholes. The borehole plan includes the estimated depth and thickness of each of the lithologies expected to be encountered while the borehole is being drilled. The drilling parameters that provided the highest ROP with low drilling dysfunctions are automatically input into a drill rig controller that controls the operation of the drill string. In this manner, the ROP of the borehole being drilled can be improved with an associated increase in reliability.

Figure 1:
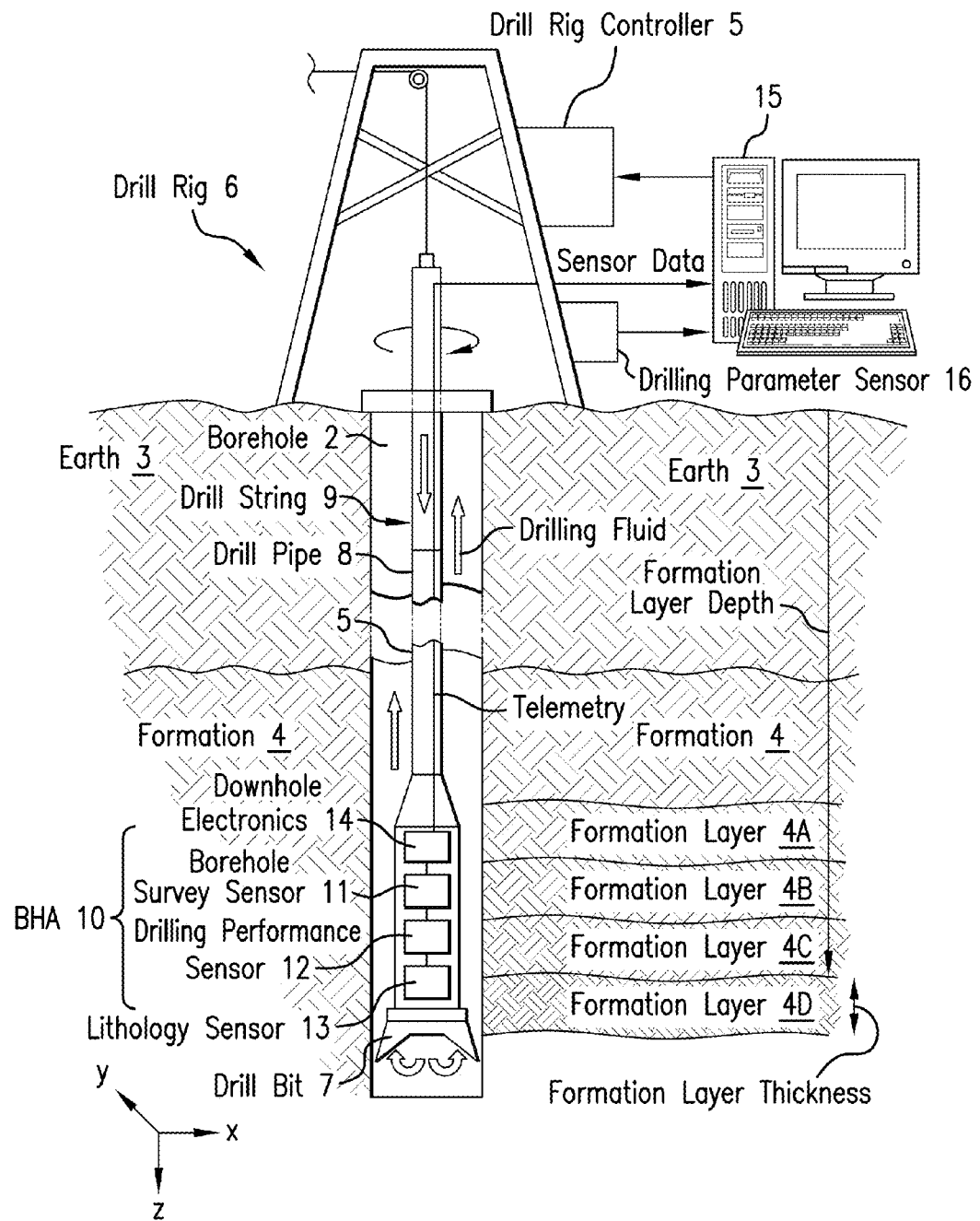
FIG. 1 illustrates a cross-sectional view of an exemplary embodiment of a drill string disposed in a borehole penetrating the earth.

Apparatus for implementing the method is now discussed with reference to FIG. 1. In FIG. 1, a cross-sectional view is illustrated of an exemplary embodiment of a drill string 9 for drilling a borehole 2 penetrating the earth 3, which includes a formation 4 having formation layers 4A-4D. (For illustration purposes, the formation layers are only illustrated on the right side of the borehole, but are also intended to be illustrative of the left side.) Each of the formation layers may represent a lithology different from a lithology of adjacent layers. The drill string 9 is made up of a series of drill pipes 8 that are connected together. A drill bit 7 for drilling or cutting into earth is disposed at the distal end of the drill string 9. A drill rig 6 is configured to conduct drilling operations such as rotating the drill string 9 and thus the drill bit 7 in order to drill the borehole 2. The drill rig 6 is also configured to control the weight-on-bit applied to the drill bit for drilling purposes. In addition, the drill rig 6 is configured to pump drilling fluid through the interior of the drill string 9 in order to lubricate the drill bit 7 and flush cuttings from the borehole 2. A drill rig controller 5 is configured to control various drilling parameters that apply force or energy to the drill string 9 for drilling the borehole 2. Non-limiting examples of these drilling parameters include weight-on-bit, applied drill string torque, and drilling fluid flow rate. A bottomhole assembly (BHA) 10 is disposed on the drill string 9 generally near the drill bit 7. The BHA 10 may include the drill bit 7 in some embodiments In the embodiment of FIG. 1, the BHA 10 includes a borehole survey sensor 11, a drilling performance sensor 12, and a lithology sensor 13. The borehole survey sensor 11 is configured to sense a location of the BHA 10 and thus of the borehole 2. "Location" refers to a trajectory or path including depth of the borehole 2 that has already been drilled. It can be appreciated that the borehole depth may be measured as a true vertical depth in order to accommodate depth measurements of deviated or horizontal boreholes. Non-limiting embodiments of the borehole survey sensor 11 include a gravity sensor for measuring true vertical depth, a magnetic field sensor for measuring azimuthal orientation, and an accelerometer that may include three orthogonal accelerometers for measuring acceleration in three dimensions. The drilling performance sensor 12 is configured to sense one or more physical properties associated with drilling the borehole 2. Non-limiting embodiments of the physical properties include vibration (such as axial vibration, lateral vibration, and/or torsional vibration), abnormal drill bit motion (such as drill bit whirl and/or stick slip), gas detection in borehole, and borehole pressure. Non-limiting embodiments of the drilling performance sensor 12 include an accelerometer for measuring vibration and abnormal drill bit motion, a gas detector, and a pressure sensor. The lithology sensor 13 is configured to sense a lithology of the formation layer that is being drilled. Non-limiting embodiments of the lithology sensor 13 include a natural radiation detector and a neutron tool, which emits neutrons that interact with the formation layer to generate radiation that is measured by the tool. Measured radiation is then correlated to a type of lithology.

Still referring to FIG. 1, downhole electronics 14 may be coupled to the sensors 11, 12, and/or 13 and configured to operate these downhole sensors, process sensor measurement data obtained downhole, and/or act as an interface with telemetry to communicate data or commands between the downhole sensors and a computer processing system 15 disposed at the surface of the earth 3. Non-limiting embodiments of the telemetry include pulsed-mud and wired drill pipe. Downhole sensor operation and data processing operations may be performed by the downhole electronics 14, the computer processing system 15, or a combination thereof. The downhole sensors may be operated continuously as the borehole is being drilled or a discrete selected depths in the borehole 2. Surface drilling parameters may be sensed by a surface drilling parameter sensor 16. Non-limiting embodiments of surface drilling parameters sensed by the sensor 16 include weight-on-bit, torque applied to the drill string, rotational speed, drilling fluid flow rate, borehole pressure, and borehole gas. The surface drilling parameters may be input into the computer processing system 15 for comparison to normal expected values and to threshold values, which if exceeded may cause the computer processing system to display an alarm to an operator or automatically input new drilling parameters into the drill rig controller 5.

Figure 2:
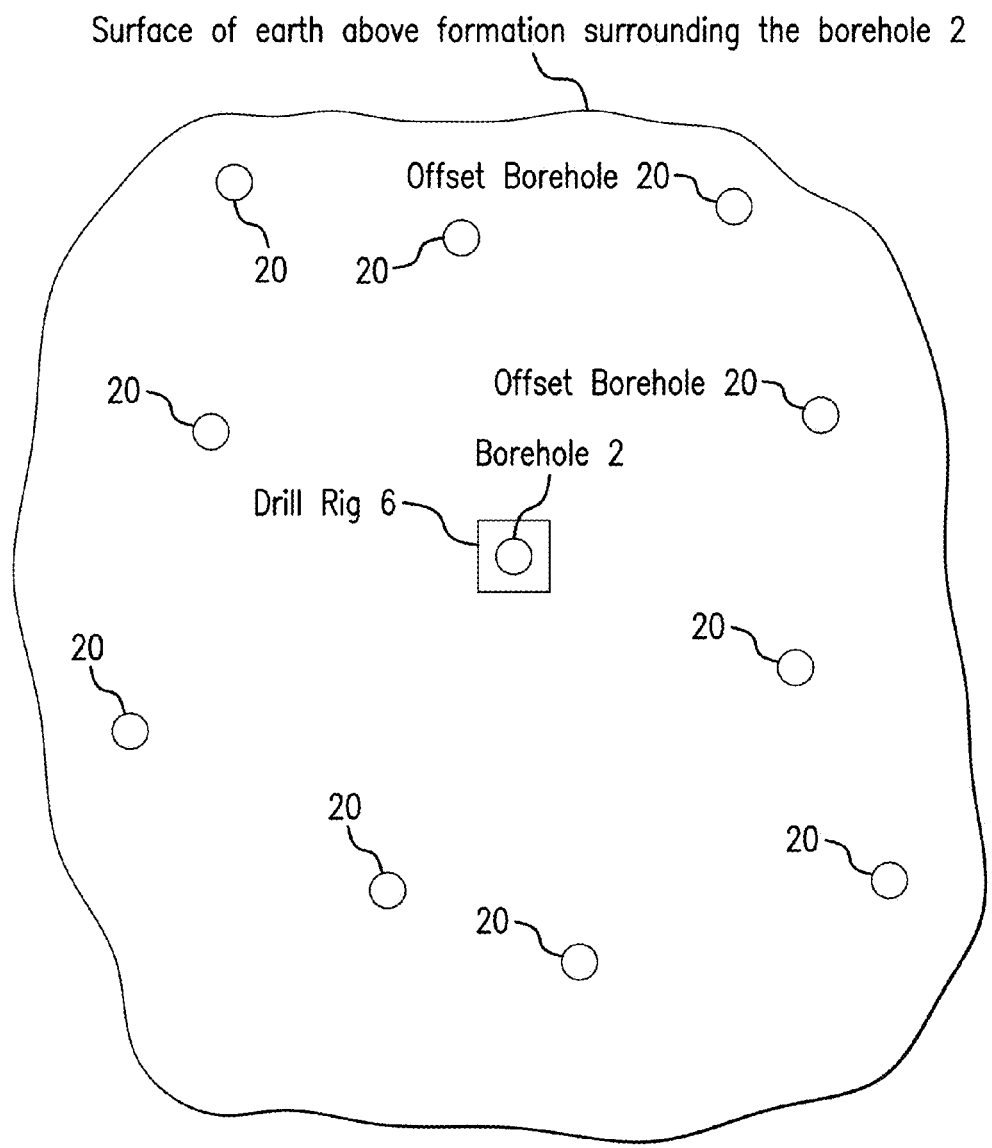
FIG. 2 is a top-view of the surface of the earth illustrating the borehole being drilled and several offset boreholes already drilled into the same or similar formation.

Referring now to FIG. 2, a top view of the surface of the earth where the borehole 2 is being drilled is illustrated. FIG. 2 also illustrates several offset boreholes 20. The offset boreholes 20 were previously drilled into the same or similar formation layers as the formation layers that are expected to be encountered while drilling the borehole 2. Each of the offset boreholes 20 is associated with the drilling parameters that were used to drill each of those boreholes. The offset borehole drilling parameters include the drilling parameters used for drilling through each formation layer encountered having a particular lithology, the depth and thickness of each of the formation layers having the particular lithology, and the corresponding rate of penetration or ROP for each of the formation layers having the particular lithology. Each of the offset boreholes 20 may also be associated with any drilling dysfunctions that may have been encountered during the drilling of the offset boreholes 20 with the associated drilling parameters. This data may be entered as a data set into a processing system such as the computer processing system 15 for example.

It can be appreciated that once the data for the offset borehole drilling parameters are obtained, a borehole plan may be drafted for the borehole 2 to be drilled. The borehole plan may include a desired trajectory or path that the borehole 2 is to follow and the formation layers (including depth and thickness) that are to be drilled. It can be appreciated that when a dip angle of a formation layer penetrated by an offset borehole 20 is known, the depth of the formation layer at the site of the borehole 2 or at points along the desired trajectory may be estimated using geometry and extrapolation techniques.

Figure 3:
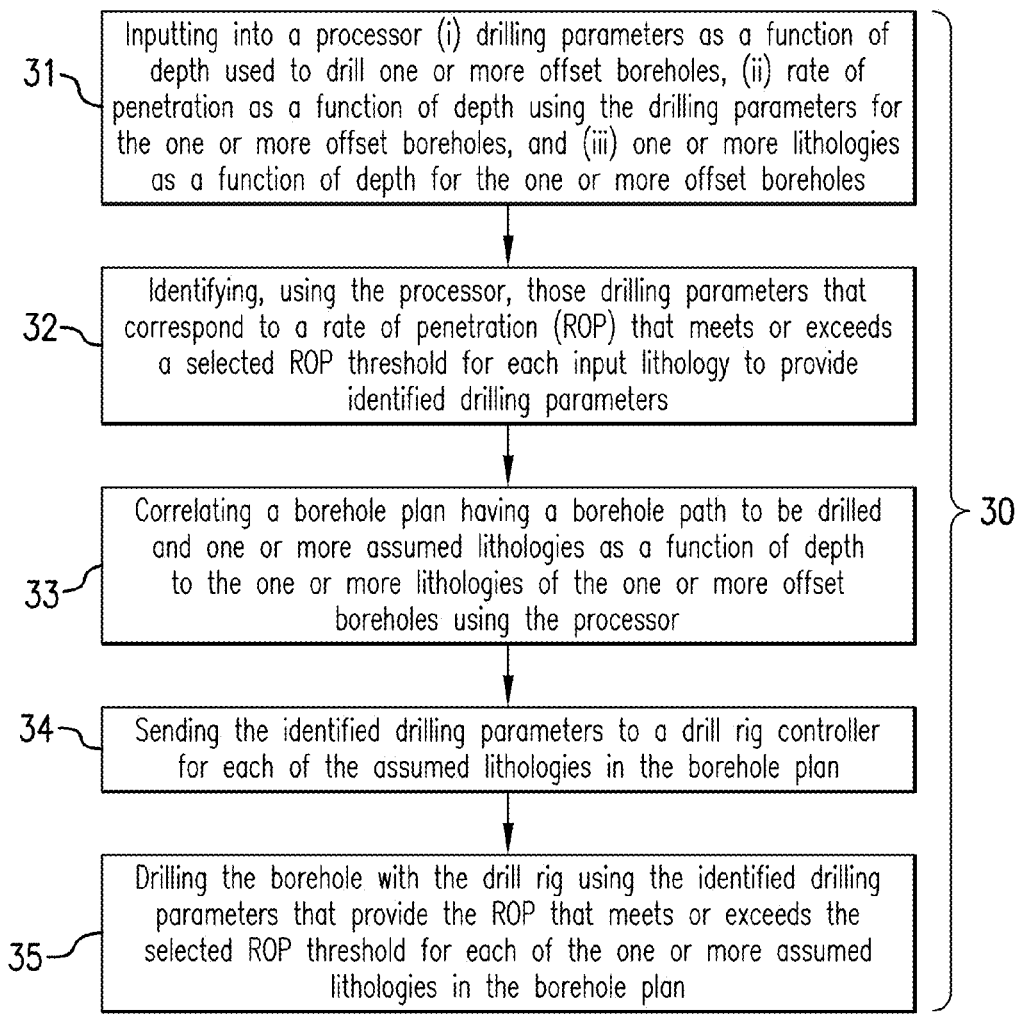
FIG. 3 is a flow chart for a method for drilling a borehole penetrating the earth using a drill rig that operates a drill string.

FIG. 3 is a flow chart for a method 30 for drilling a borehole penetrating the earth using a drill rig that operates a drill string. Block 31 calls for inputting into a processor (i) drilling parameters as a function of depth used to drill one or more offset boreholes, (ii) rate of penetration as a function of depth using the drilling parameters for the one or more offset boreholes, and (iii) one or more lithologies as a function of depth for the one or more offset boreholes.

Block 32 calls for identifying, using the processor, those drilling parameters that correspond to a rate of penetration (ROP) that meets or exceeds a selected ROP threshold for each input lithology to provide identified drilling parameters. In other words, the drilling parameters that provided the highest ROP for each particular lithology drilled are identified so that if a particular lithology is identified for being drilled in the new borehole, then those parameters resulting in the ROP meeting or exceeding the selected ROP threshold for each of the one or more assumed lithologies in the borehole plan can be used to drill that particular lithology. In one or more embodiments, the selected ROP threshold for each input lithology is the set of drilling parameters that results in the highest measured or observed ROP. In one or more embodiments, the selected ROP threshold for each input lithology may be less than the highest measured or observed ROP in order to lessen the risk or likelihood of drilling dysfunctions. In these embodiments, the selected ROP threshold for each of the one or more assumed lithologies in the borehole plan may be selected in order to minimize the cost per foot of drilled borehole by balancing the increased cost due to decreasing the ROP from the maximum with the costs saved by decreasing the number and/or magnitude of drilling dysfunctions. It can be appreciated that an economic analysis based on the particular factors related to the new borehole may be performed in order to determine the selected ROP threshold.

Block 33 calls for correlating a borehole plan comprising one or more assumed lithologies as a function of depth to the one or more lithologies of the one or more offset boreholes using the processor. In other words, the borehole plan includes a desired trajectory of the borehole to be drilled and the formation layers, each having an associated lithology, depth and thickness that are expected to be drilled along the trajectory. In block 33, the expected lithology is matched or correlated to a formation layer lithology that was encountered in one or more of the offset boreholes.

Block 34 calls for sending the identified drilling parameters to a drill rig controller for each of the assumed lithologies in the borehole plan. In one or more embodiments, the sending may include electronically or optically transmitting the identified parameters to the drill rig controller or the sending may include providing the drill rig controller with a readable medium having encoded thereon the identified drill parameters and associated depths and depth intervals for which the identified drilling parameters are to be applied to the drill rig.

Block 35 calls for drilling the borehole with the drill rig using the identified drilling parameters that provide the ROP that meets or exceeds the selected ROP threshold for each of the one or more assumed lithologies in the borehole plan.

In one or more embodiments of the method 30, the drilling parameters include at least one of torque applied to a drill string operated by the drill rig, weight on bit, drilling fluid flow rate, and drill string rotational speed.

In one or more embodiments of the method 30, the depth discussed in the method 30 is the true vertical depth in order to account for a borehole deviated from the vertical or horizontal boreholes.

In one or more embodiments of the method 30, the method 30 may include automatically transmitting identified drilling parameters to a drill rig controller for a change in lithology when a depth is reached signifying the beginning of an interval of the changed lithology according to the borehole plan.

In one or more embodiments of the method 30, the method 30 may include identifying a lithology currently being drilled using a downhole sensor disposed on a drill string drilling the borehole and updating the borehole plan using the lithology identified by the downhole sensor.

In one or more embodiments of the method 30, the method 30 may include identifying a location of a drill string drilling the borehole using a sensor disposed on the drill string and updating the borehole plan using the identified location. The location may include information describing the depth and azimuthal orientation of points along the path or trajectory of the drilled borehole so that one of ordinary skill in the art or a processing system can plot the path of the borehole on a map or record its position in a data base.

In one or more embodiments of the method 30, the method 30 may include inputting into the processor any drilling dysfunctions that occurred using the drilling parameters for the one or more offset boreholes and wherein identifying in Block 32 further includes identifying those drilling parameters that have a minimum number of drilling dysfunctions and/or minimum magnitude of a drilling dysfunction as being identified drilling parameters. In one or more embodiments, the drilling dysfunctions may include at least one of vibrations (axial, lateral, and/or rotational) of a drill string operated by the drill rig exceeding a threshold value, torque applied to the drill string exceeding a threshold value, and borehole pressure exceeding a threshold value. A minimum number of drilling dysfunctions relates to a minimum number or occurrences of drilling dysfunctions while a minimum magnitude relates to a minimum amplitude of a drilling dysfunction such as a vibration. Threshold values may be determined by analysis or evaluation of field data such that the likelihood or probability of drilling dysfunctions occurring (number of occurrences and/or magnitude) is reduced or minimized.

In one or more embodiments of the method 30, the method 30 may include sending an override signal from the processor to the drill rig controller based on a drilling performance indicator sensed by a drilling performance sensor. In one or more embodiments, the drilling performance indicator includes at least one of axial vibration, lateral vibration, torsional vibration, abnormal drill bit motion, gas detection, and borehole pressure. In one or more embodiments, sending may include the processor automatically sending the override signal when the drilling performance indicator exceeds a threshold value. In one or more embodiments, the method 30 may include displaying the drilling performance indicator to a user and sending may include the user providing a manual input to the processor for sending the override signal based on the displayed performance indicator using a manual input device such as a pushbutton switch for example.

In one or more embodiments of the method 30, the method 30 may include (a) receiving borehole survey information from a borehole survey sensor, the survey information having a borehole trajectory including depth of the borehole being drilled and (b) cross-checking the lithology assumed in the drilling parameters with the survey information based on depth. The method 30 may also include updating the drilling parameters based on the survey information. In one or more embodiments of the method 30, the method 30 may include comparing the rate of penetration (ROP) assumed by the identified drilling parameters to the actual ROP sensed by a drill rig sensor and updating the drilling parameters being used when a difference between the assumed ROP and the actual ROP exceeds a threshold value, wherein the updated drilling parameters are based on a lithology different from the lithology assumed in the borehole plan. The threshold value in this case may account for instrument or sensor error so that false indications are prevented.

The above disclosed techniques provide several advantages. One advantage is that the ROP may be improved over the ROP resulting from using conventional techniques to determine drilling parameters. Another advantage is that the number and/or magnitude of drilling dysfunctions may be decreased compared to the number and/or magnitude of drilling dysfunctions resulting from using conventional techniques to determine drilling parameters. Yet another advantage is the total cost of drilling the borehole may be decreased by both improving the ROP and decreasing the number and/or magnitude of drilling dysfunctions.

In support of the teachings herein, various analysis components may be used, including a digital and/or an analog system. For example, the downhole electronics 14, the computer processing system 15, the downhole sensors 11, 12 and 13, the drill rig controller 5, or the surface drilling parameter sensor 16 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates to a structural limitation of an apparatus that allows the apparatus to perform the task or function for which the apparatus is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for drilling a borehole penetrating the earth using a drill rig that operates a drill string, the method comprising:
    inputting into a processor (i) drilling parameters as a function of depth used to drill one or more offset boreholes, (ii) rate of penetration using the drilling parameters for the one or more offset boreholes, (iii) any drilling dysfunctions that occurred using the drilling parameters for the one or more offset boreholes, and (iv) one or more lithologies as a function of depth for the one or more offset boreholes;
    identifying, using the processor, those drilling parameters that correspond to a rate of penetration (ROP) that meets or exceeds a selected ROP threshold for each input lithology to provide identified drilling parameters and/or to a minimum number of drill dysfunctions or minimum magnitude of a drilling dysfunction to provide identified drilling parameters;
    correlating a borehole plan comprising a borehole path to be drilled and one or more assumed lithologies as a function of depth to the one or more lithologies of the one or more offset boreholes;
    automatically transmitting identified drilling parameters to a drill rig controller for a change in lithology when a depth is reached signifying the beginning of an interval of the changed lithology according to the borehole plan;
    drilling the borehole with the drill rig using the identified drilling parameters that provide the ROP that meets or exceeds the selected ROP threshold for each of the one or more assumed lithologies in the borehole plan; and
    sending an override signal from the processor to the drill rig controller based on a drilling performance indicator sensed by a drilling performance sensor.

2. The method according to claim 1, further comprising (a) receiving borehole survey information from a borehole survey sensor, the survey information comprising a borehole trajectory including depth of the borehole being drilled and (b) cross-checking the lithology assumed in the drilling parameters with the survey information based on depth.

3. The method according to claim 2, further comprising updating the drilling parameters based on the survey information.

4. The method according to claim 2, further comprising comparing the rate of penetration (ROP) assumed by the identified drilling parameters to the actual ROP sensed by a drill rig sensor and updating the drilling parameters being used when a difference between the assumed ROP and the actual ROP exceeds a threshold value.

5. The method according to claim 4, wherein the updated drilling parameters are based on a lithology different from the lithology assumed in the borehole plan.

6. The method according to claim 2, wherein the borehole survey sensor is disposed on the drill string.

7. The method according to claim 1, further comprising inputting into the processor any drilling dysfunctions that occurred using the drilling parameters for the one or more offset boreholes and wherein identifying further comprises identifying those drilling parameters that have a minimum number of drill dysfunctions or minimum magnitude of a drilling dysfunction as being identified drilling parameters.

8. The method according to claim 7, wherein drilling dysfunctions comprise at least one of vibrations of a drill string operated by the drill rig exceeding a threshold value, torque applied to the drill string exceeding a threshold value, and borehole pressure exceeding a threshold value.

9. The method according to claim 1, wherein the drilling parameters comprise at least one of torque applied to a drill string operated by the drill rig, weight on bit, drilling fluid flow rate, and drill string rotational speed.

10. The method according to claim 1, wherein the depth is true vertical depth.

11. The method according to claim 1, further comprising identifying a lithology currently being drilled using a downhole sensor disposed on the drill string drilling the borehole and updating the borehole plan using the lithology identified by the downhole sensor.

12. The method according to claim 1, further comprising identifying a location of a drill string drilling the borehole using a sensor disposed on the drill string and updating the borehole plan using the identified location.

13. The method according to claim 1, wherein the drilling performance indicator comprises at least one of axial vibration, lateral vibration, torsional vibration, abnormal drill bit motion, gas detection, and borehole pressure.

14. The method according to claim 1, wherein sending comprises the processor automatically sending the override signal when the drilling performance indicator exceeds a threshold value.

15. The method according to claim 1, further comprising displaying the drilling performance indicator to a user and wherein sending comprises the user providing a manual input to the processor for sending the override signal based on the displayed performance indicator.

16. The method according to claim 1, wherein the drilling performance sensor is disposed on the drill string and the drilling performance indicator is measured in the borehole.

* * * * *